L. B. WYGANT.
FEEDER FOR HAY PRESSES.
APPLICATION FILED APR. 28, 1909.
966,635.
Patented Aug. 9, 1910.
2 SHEETS—SHEET 1.
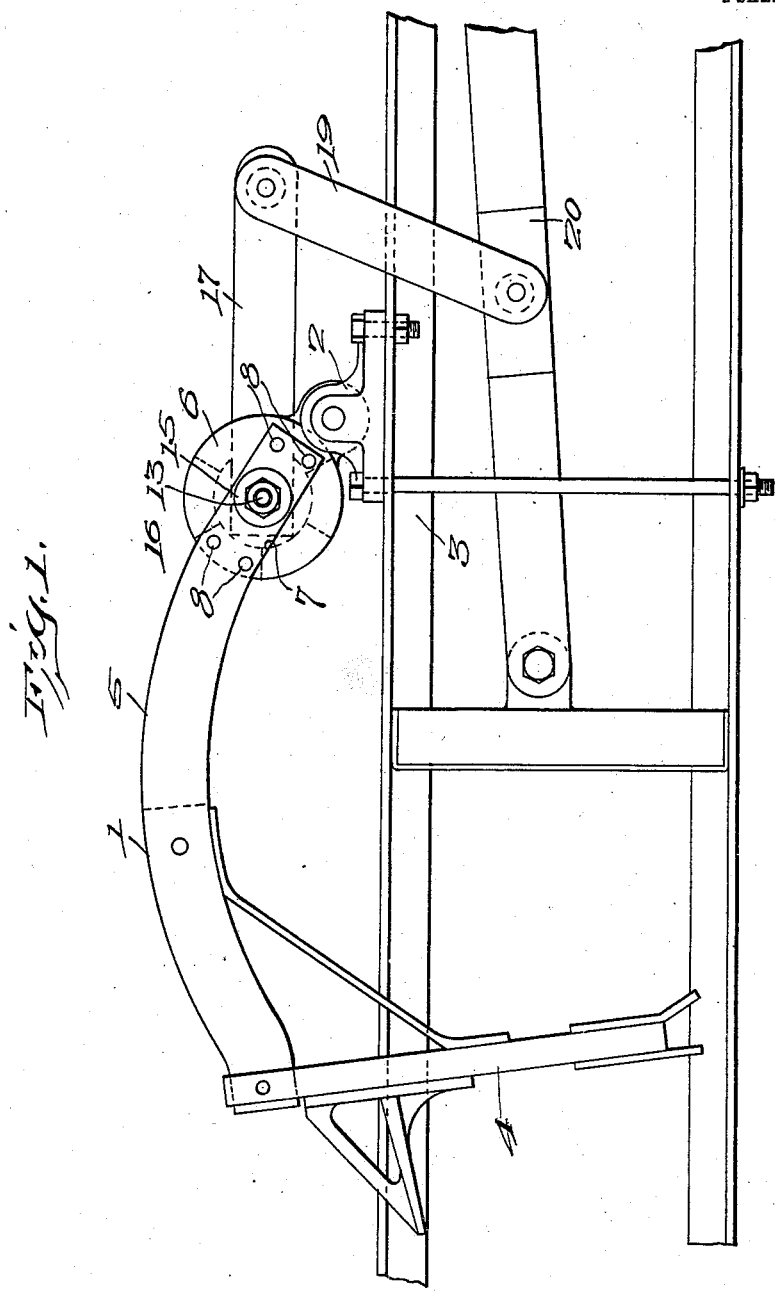
Witnesses
Howard Walmsley
Edward Reed
Inventor
Lewis B. Wygant,
By H. A. Toulmin,
Attorney.

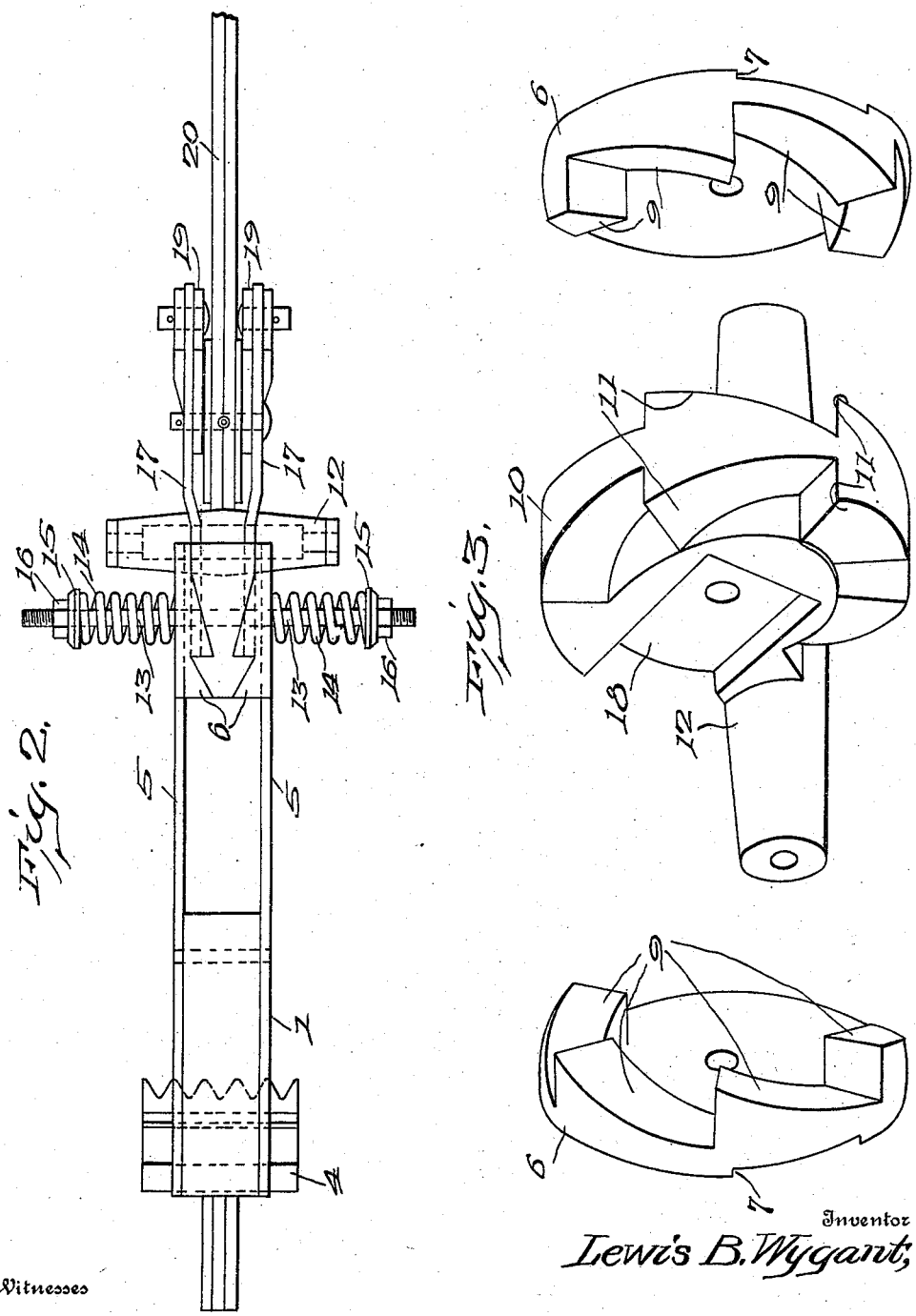

UNITED STATES PATENT OFFICE.

LEWIS B. WYGANT, OF BELLEVUE, OHIO, ASSIGNOR TO THE OHIO CULTIVATOR COMPANY, OF BELLEVUE, OHIO, A CORPORATION OF OHIO.

FEEDER FOR HAY-PRESSES.

966,635.  Specification of Letters Patent.  Patented Aug. 9, 1910.

Application filed April 28, 1909. Serial No. 492,643.

*To all whom it may concern:*

Be it known that I, LEWIS B. WYGANT, a citizen of the United States, residing at Bellevue, in the county of Huron and State of Ohio, have invented certain new and useful Improvements in Feeders for Hay-Presses, of which the following is a specification, reference being had therein to the accompanying drawings.

This invention relates to feeders for hay presses, and the object of the invention is to interpose in the feeding mechanism, or feeder, a yieldable connection, whereby, should the feeder meet with excessive resistance, one part thereof will be permitted to move relatively to another part thereof without breakage; to provide a feeder of this character having the feeder arm formed in two parts and the yieldable connection interposed between the two parts of said arm; and to provide such a yieldable connection which will combine a maximum of strength and efficiency with a minimum number of parts.

With these objects in view my invention consists in certain novel features and in certain combinations and arrangements of parts hereinafter to be described, and then more particularly pointed out in the claims.

In the accompanying drawings, Figure 1 is a side elevation of a feeder embodying my invention; Fig. 2 is a top plan view of the same; and Fig. 3 is a detail view of the yieldable connection, showing the same as separated into its component parts.

In these drawings I have illustrated one embodiment of my invention and have shown the same as applied to a feeder of known construction comprising a feeder arm 1 pivotally supported at one end in bearings 2 carried by the frame 3 of a hay press. The arm 1 is provided at its forward end, or the end opposite the point of support on the frame, with a feeder head 4 adapted to enter the hopper of the press and move the hay into the path of the plunger. A yieldable connection of any suitable character is interposed between the feeder head 4 and the point of support on the main frame 3. In the present instance I have shown the feeder arm 1 as formed in two parts and have interposed the yieldable connection between the two parts of this arm in the form of friction disks. The forward portion of the arm 1 preferably comprises two side members 5 which are preferably formed of metal or other resilient material which will permit the two members to have a certain amount of lateral movement relatively one to the other. The two members, 5, are spaced some distance apart and each has secured thereto near the inner end thereof, or the end removed from the end carrying the feeder head 4, a disk 6. The end of each arm 5 is preferably inserted in a suitable recess or socket 7 formed in the outer face of the respective disk and is secured thereto by means of bolts 8. The inner face of each disk is provided with one or more inclined or cam surfaces 9, the two disks being so arranged that the cam or inclined surfaces of each disk will be arranged directly opposite one to the other. In the present instance I have shown four of these inclined surfaces on each disk and have shown the same arranged about the edge of the disk in the form of inwardly extending teeth.

Arranged between the two disks 6 is a third disk 10 provided on its opposite sides with inclined or cam surfaces 11, which surfaces are inclined in a direction opposite to the inclination of the inclined surfaces of the disks 6 and are so arranged that they will interlock with the teeth or inclined surfaces of the outer disks 6 in such a manner that the three disks will fit snugly together. The disk 10 is rigidly secured to the inner portion of the arm 1, *i. e.*, the portion which is supported on the frame 3. In the present instance I have shown the disk 10 as provided with a bearing block 12 which is formed integral therewith and serves to support the same in the bearings 2 on the main frame 3. Thus, the disk 10 and bearing block 12 comprise the rearward portion of the arm 1.

A rod 13 extends centrally through the outer disks 6 and the central disk 10 and coiled springs 14 are mounted on said rod with their inner ends bearing against the outer faces of the arms 5 to which the disks 6 are secured. The outer ends of the rod 13 are screw-threaded and have mounted thereon washers 15 and nuts 16, by means of which the springs 14 are confined on the rod and the tension of the springs is regulated. The rear portion of the feeder arm 1 is connected to the usual operating mechanism in any suitable manner. In the present instance a bar 17 is shown as rigidly secured to the inner portion of the arm 1 by inserting the inner ends of the two members comprising the bar in sockets or cut-away portions 18 in opposite sides of the disk 10. The outer end of the bar 17 is connected by means of a link 19 with a lever 20 which is connected to the driving mechanism of the press in the usual manner.

The operation of the device will be readily understood. Briefly, it is as follows: The tension of the springs 14 is so adjusted that they will successfully resist the pressure exerted upon the forward portion of the feeder arm 1 during the normal operation of the feeder, and so that, should the feeder meet with an excessive resistance, as by coming into contact with some foreign object, the pressure exerted upon the forward portion of the arm 1 will overcome the tension of the springs 14 and the inclined surfaces of the disks 6 will ride over the inclined surfaces of the central disk 10, thus permitting the rear portion of the arm 1 to continue its movement after the movement of the forward portion of the arm has been checked. The length of the inclined surfaces of the disks 6 and 10 are such that their opposite edges will never be moved beyond each other. Consequently, as soon as the rear portion of the feeder arm begins its return movement the parts will automatically resume their normal position and the operation of the feeder will be continued without interruption.

While I have shown and described a particular form of yieldable connection as interposed between the two parts of the feeding mechanism it will be apparent that this construction may be varied without departing from the principle of my invention, and, I therefore wish it to be understood that I do not desire to be limited to the details of construction shown and described, for obvious modifications will occur to a person skilled in the art.

Having thus fully described my invention, what I claim as new and desire to secure by Letters Patent, is:—

1. In a hay press, the combination, with a feeding mechanism, of a yieldable connection comprising oppositely inclined surfaces interposed in said feeding mechanism.

2. In a hay press, the combination, with a feeding mechanism, comprising a feeder arm, a pivotal support for one end of said arm, and a feeder head carried at the other end of said arm, of a yieldable connection comprising oppositely inclined surfaces interposed in said feeder mechanism between said feeder head and said support.

3. In a hay press, the combination, with a frame, a feeding mechanism comprising a two part arm, means for pivotally supporting one part of said arm on said frame, and a feeder head carried by the other part of said arm, of a yieldable connection comprising oppositely inclined surfaces interposed between the two parts of said arm.

4. In a hay press, the combination, with a feeding mechanism comprising two parts, of a member carried by one of said parts and having cam surfaces on one side thereof, a member carried by the other part of said feeding mechanism and having cam surfaces arranged to coöperate with the cam surfaces on the first-mentioned member, and means for resisting the movement of said members relatively one to the other.

5. In a hay press, the combination, with a feeding mechanism comprising two parts, and a pair of disks carried by one of said parts, spaced some distance apart and having their adjacent faces provided with cam surfaces, a disk carried by the other part of said feeding mechanism arranged between the two first-mentioned disks and having cam surfaces arranged to coöperate with the cam surfaces on said first mentioned disks, and means for resisting the lateral movement of said first-mentioned disks.

6. In a hay press, the combination, with a feeding mechanism comprising two parts, and a pair of disks carried by one of said parts, spaced some distance apart and having their adjacent faces provided with cam surfaces, a disk carried by the other part of said feeding mechanism arranged between the two first-mentioned disks and having cam surfaces arranged to coöperate with the cam surfaces on said first-mentioned disks, and springs arranged on opposite sides of said first-mentioned disks and adapted to resist the outward movement thereof.

7. In a hay press, the combination, with a feeding mechanism comprising two parts, and a pair of disks carried by one of said parts, spaced some distance apart and having their adjacent faces provided with cam surfaces, a disk carried by the other part of said feeding mechanism arranged between the two first-mentioned disks and having cam surfaces arranged to coöperate with the cam surfaces on said first-mentioned disks, a rod extending through each of said disks, a spring coiled about said rod on the outside of each of said first-mentioned disks, and means carried by said rod for adjusting the tension of said springs.

8. In a hay press, the combination, with a two part feeder arm, one part of said arm comprising two parallel members, a disk secured to the adjacent ends of each of said members and provided on their inner faces with inclined surfaces, of a disk carried by the other part of said arm and having an inclined surface on each face thereof, said inclined surface being arranged to coöperate with the inclined surfaces of the first-mentioned disks, and means for resisting the outward movement of said first-mentioned disks.

9. In a hay press, the combination, with a two part feeder arm, a pair of disks carried by one part of said arm, spaced some distance apart and having their adjacent sides provided with inclined surfaces, of a disk arranged between the first-mentioned disks, having its opposite sides provided with inclined surfaces arranged to coöperate with the inclined surfaces of the first-mentioned disks, and a bearing block rigidly secured to said last-mentioned disk.

10. In a hay press, the combination, with a two part feeding mechanism, of a member carried by one part of said feeding mechanism and having an inclined bearing surface on one side thereof, a member carried by the other part of said feeding mechanism and having an inclined surface arranged to coöperate with the inclined surface of the first-mentioned member, and resilient means for resisting the lateral movement of said members relatively one to the other.

11. In a hay press, the combination, with feeding mechanism comprising a two part arm, of a member secured to each part of said arm, means for yieldingly connecting said members one to the other, and means arranged between said members for forcing the same apart when one member is moved relatively to the other.

12. In a press, feeding mechanism comprising a feeder-arm, a feeder head, a friction-controlled connection between said arm and said head, said connection being arranged to yield when the head encounters extraordinary resistance, and means for automatically restoring said arm and said head to their normal positions relative one to the other.

13. In a press, a beater-arm, a support movably connected with said arm, a head carried by said support, friction mechanism for normally holding said beater arm and said support in fixed relation to each other, and means for automatically restoring said arm and said head to their normal positions relative one to the other.

14. In a press, a beater-arm, a support movably connected to said arm, a head carried by said support, and friction disks carried by said arm and said support, respectively, said disks acting to hold said parts normally in their proper relative positions and to yield to permit said parts to move relatively one to the other when said head encounters extraordinary resistance.

15. In a press, feeding mechanism comprising a feeder-arm, a feeder head, friction disks connected to said arm and said head, respectively, to hold the same normally in fixed relation one to the other, said friction disks being adapted to move relatively one to the other when said head encounters extraordinary resistance, and means for automatically restoring said disks to their normal positions.

In testimony whereof, I affix my signature in presence of two witnesses.

LEWIS B. WYGANT.

Witnesses:
  E. A. KEMP,
  E. H. ERDRICH.